July 30, 1929.  B. JONES  1,722,469
ANTISURGE DEVICE
Filed Dec. 13, 1926
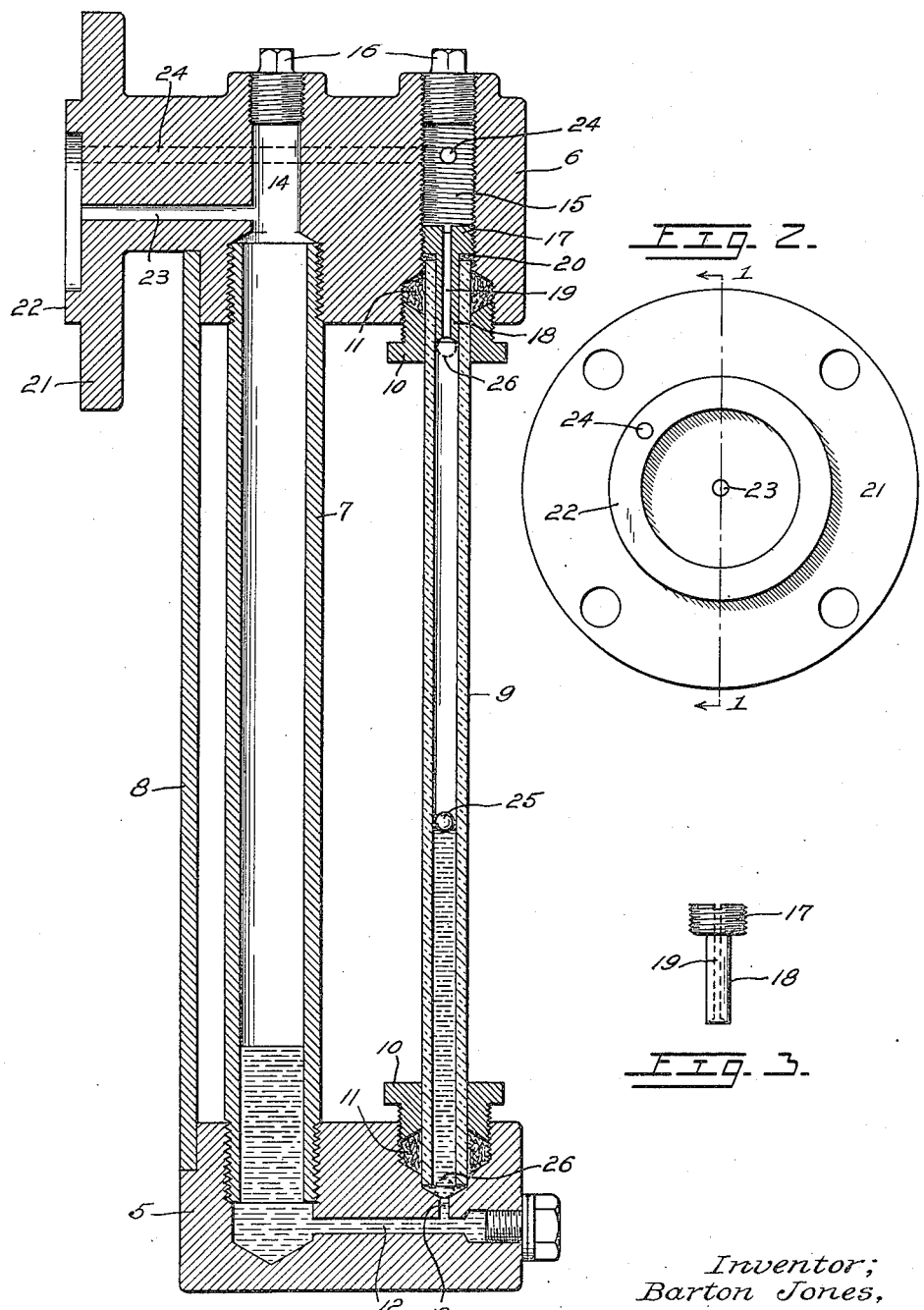
Inventor;
Barton Jones,
per Arthur J. Farnsworth.
Attorney.

Patented July 30, 1929.

1,722,469

UNITED STATES PATENT OFFICE.

BARTON JONES, OF LOS ANGELES, CALIFORNIA.

ANTISURGE DEVICE.

Application filed December 13, 1926. Serial No. 154,545.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to anti-surge devices for liquid manometers, and it is particularly adapted for use in mercury gauges. Its principal objects include; first, to provide adequate means for preventing the escape of the indicating fluid from such instruments when sudden and violent changes in pressure occur; second, to furnish facilities for preventing the mercury column in such gauges from rising above the top of the indicating tube; third, to supply a way for preventing the indicating fluid from being drawn out of the manometer by a vacuum; and, fourth, to accomplish the above results by the use of a very simple and inexpensive device.

My objects are attained in the manner illustrated in the accompanying drawing, in which—

Figure 1 is a vertical central section of a detachable mercury manometer for indicating differential pressures, with my invention applied thereto;

Figure 2 is an elevational view of the attaching face of the above instrument; and Figure 3 is an elevation of the special valve seat fitting that I employ at the top of the indicating tube in such instruments, which constitutes an essential part of my invention.

Similar reference numerals refer to similar parts throughout the several views.

It will be realized, of course, that in a gauge of this type it is necessary to preserve the contained volume of indicating fluid intact. Any loss of this fluid would result in false indications of the instrument thereafter, and sudden and violent fluctuations of pressure might easily bring about such a loss if not provided against. That is to say, a violent pressure change might easily force a part of the indicating fluid entirely out of the instrument and destroy its accuracy.

It will be further realized that when mercury is used in manometers it is highly desirable to confine it within material that is not affected by it. Mercury has a tendency to amalgamate with many other metals, and if it is allowed to come into contact with such there will be a loss due to amalgamation. Moreover the results of this may be deleterious to the parts affected.

In differential pressure gauges of the type illustrated it is common to make the lower fittings of cast iron. This material is not affected by the mercury and may be used for containing the principal quantity thereof. The upper portions of such instruments, particularly detachable instruments, are preferably made of non-rusting metal such as brass or bronze. Such metals amalgamate with mercury, and should be kept out of contact therewith.

In the accompanying drawing I have shown a detachable differential pressure gauge employing a mercury column and equipped with my invention. It comprises a lower fitting 5 of cast iron and an upper fitting 6 of any desirable material. These fittings are connected by an iron tube 7 and a backing plate 8. They are also connected by a glass indicating tube 9 which passes through gland nuts 10 and stuffing boxes 11 in the respective fittings.

Fitting 5 is provided with passages 12 and 13, by means of which communication is established between the lower ends of tubes 7 and 9.

Fitting 6 has bores 14 and 15 above tubes 7 and 9 respectively and co-axial therewith. These bores are closed at the top by plugs 16 and provide means for introducing mercury. Bore 15 is internally threaded its full length and the upper end of tube 9 extends thereinto. A special valve seat fitting, which is formed of material unaffected by mercury and is illustrated by itself in Fig. 3, is screwed down in bore 15 against the upper end of tube 9. This valve seat fitting has a screw-threaded head 17, an integral nipple 18, and an axial bore 19. It carries a packing washer 20 on the nipple against the head and this washer is compressed between the head and the upper end of tube 9 to form a mercury-tight joint.

Fitting 6 has an attaching flange 21 by means of which it can be connected to a correspondingly formed companion surface on a flow line or other apparatus where differential pressures are to be measured. The face of this flange has an annular rib 22 adapted to enter a corresponding circular channel on the companion surface to which the instrument is to be attached. A passage 23, co-axial with flange 21 leads from its face to bore 14. Another passage 24 leads from the face of rib 22 to bore 15. Corresponding passages in the apparatus to which the instrument is applied (not shown) lead to the center of the companion attaching surface and its circular groove respectively. In this manner, when the instrument is properly attached, differential pressures may be applied to the mercury columns in tubes 7 and 9, and the level of the mercury in tube 9 will indicate the pressure differential.

In order to accomplish the stated objects of my invention, I float a steel ball 25 upon the mercury column in tube 9. I also form the lower end of nipple 18 and the surface surrounding the upper end of passage 13 in such a way that the ball may seat itself thereon to close passages 19 and 13 respectively, as indicated by dotted circles 26.

From the foregoing description it will be apparent that an increase in pressure differential that otherwise would force the mercury out of the top of tube 9 will be prevented from doing this by the seating of the ball on the lower end of nipple 18. It will also be seen that a reverse or negative pressure differential that otherwise would draw the mercury out of the bottom of tube 9 will be prevented from doing this by the seating of the ball over passage 13. In this case, after the ball seats, the mercury cannot be drawn away from it since a Torricellian vacuum would be created thereby. Still further it will be noticed that mercury will be prevented from coming into contact with any parts above tube 9.

Having thus fully described my invention, I claim:

1. A manometer comprising; an upright transparent tube with liquid therein; a ball within the tube floating upon the liquid; an axially bored fitting having a head, and a nipple extending downwardly therefrom within the tube at its upper end; a packing washer on the nipple adjacent the head; means for compressing the washer between the head and the upper end face of the tube; and a fitting engaging the lower end of the tube having a relatively small passage communicating with the tube; the surfaces surrounding the inner ends of said axial bore and said small passage being adapted for seating said ball to close said bore and passage respectively.

2. A manometer comprising; an upper member having an internally threaded bore and a pressure passage leading therefrom; an upright transparent tube extending into said threaded bore and sealed therein; a lower member in sealed engagement with the lower end of the tube and having a relatively small pressure passage communicating therewith; pressure indicating liquid within the tube and in said small pressure passage; a ball within the tube floating upon the liquid; an axially bored fitting having a screw-threaded head engaging said threaded bore, and a nipple extending downwardly therefrom within the upper end of the tube; and a packing washer on the nipple compressed between the head and the upper end face of the tube; the surfaces surrounding the inner ends of said axial bore and said small passage being adapted for seating said ball to close said axial bore and small passage respectively.

BARTON JONES.